(12) United States Patent
Nicol-Seto

(10) Patent No.: US 8,900,062 B2
(45) Date of Patent: Dec. 2, 2014

(54) DRIVESHAFT ASSEMBLY FOR A DOWNHOLE MOTOR

(71) Applicant: National Oilwell Varco, L.P., Houston, TX (US)

(72) Inventor: Michael Eric Nicol-Seto, Edmonton (CA)

(73) Assignee: National Oilwell Varco, L.P., Houston, TX (US)

( * ) Notice: Subject to any disclaimer, the term of this patent is extended or adjusted under 35 U.S.C. 154(b) by 0 days.

(21) Appl. No.: 13/766,471

(22) Filed: Feb. 13, 2013

(65) Prior Publication Data

US 2014/0224545 A1 Aug. 14, 2014

(51) Int. Cl.
  F16D 3/40 (2006.01)
  E21B 4/02 (2006.01)
  F16D 3/10 (2006.01)

(52) U.S. Cl.
  CPC .... *F16D 3/10* (2013.01); *E21B 4/02* (2013.01)
  USPC .......................................... 464/136; 464/155

(58) Field of Classification Search
  CPC ....... E21B 7/068; E21B 17/05; E21B 17/046; E21B 17/20
  USPC ........... 464/19, 117–124, 136, 155, 156, 125, 464/132
  See application file for complete search history.

(56) References Cited

U.S. PATENT DOCUMENTS

| | | | |
|---|---|---|---|
| 991,807 A * | 5/1911 | Spade | 464/132 X |
| 2,499,030 A * | 2/1950 | Moon | 464/119 |
| 3,029,617 A * | 4/1962 | Marquis et al. | 464/123 |
| 3,339,379 A * | 9/1967 | Snyder | |
| 3,406,534 A * | 10/1968 | Chapper | 464/119 X |
| 4,263,788 A | 4/1981 | Beimgraben | |
| 4,772,246 A | 9/1988 | Wenzel | |
| 4,904,228 A | 2/1990 | Frear et al. | |
| 4,982,801 A | 1/1991 | Zitka et al. | |
| 5,000,723 A | 3/1991 | Livingstone | |
| 5,048,622 A | 9/1991 | Ide | |
| 5,078,650 A | 1/1992 | Foote | |
| 5,267,905 A | 12/1993 | Wenzel et al. | |
| 5,288,271 A | 2/1994 | Nelson et al. | |
| 5,671,816 A * | 9/1997 | Tibbitts | 464/19 X |

(Continued)

FOREIGN PATENT DOCUMENTS

| | | |
|---|---|---|
| CA | 1290952 C | 10/1991 |
| CA | 2023042 C | 4/1994 |

(Continued)

OTHER PUBLICATIONS

International Patent Application No. PCT/US2014/015042 International Search Report and Written Opinion dated Jul. 23, 2014 (13 pages).

*Primary Examiner* — Gregory Binda
(74) *Attorney, Agent, or Firm* — Conley Rose, P.C.

(57) ABSTRACT

A driveshaft for a downhole motor has a longitudinal axis and includes a first end. In addition, the driveshaft includes a second end opposite the first end. The first end has a radially outer surface including a first connection lug. The outer surface also includes a second connection lug uniformly circumferentially-spaced from the first connection lug. The first connection lug and the second connection lug each include a cylindrical surface concentrically disposed about a first pivot axis oriented orthogonal to the longitudinal axis.

30 Claims, 10 Drawing Sheets

(56) References Cited

U.S. PATENT DOCUMENTS

| | | |
|---|---|---|
| 5,704,838 A | 1/1998 | Teale |
| 7,186,182 B2 | 3/2007 | Wenzel et al. |
| 8,033,917 B2 | 10/2011 | Prill et al. |
| 2011/0005839 A1 | 1/2011 | Marchand et al. |

FOREIGN PATENT DOCUMENTS

| | | | |
|---|---|---|---|
| CA | 2541339 C | 5/2012 | |
| GB | 2281577 A | 3/1995 | |
| SE | 103 189 | * 12/1941 | ............ 464/119 |
| WO | 2009/132414 A1 | 11/2009 | |

* cited by examiner

DRIVESHAFT ASSEMBLY FOR A DOWNHOLE MOTOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

1. Field of the Disclosure

The disclosure relates generally to universal joints for transmitting torque between rotating shafts having intersecting but non-coincident rotational axes. More particularly, the disclosure relates to universal joints for driveshafts associated with downhole motors used in the oil and gas drilling operations.

2. Background of the Technology

In drilling a borehole into an earthen formation, such as for the recovery of hydrocarbons or minerals from a subsurface formation, it is conventional practice to connect a drill bit onto the lower end of a drillstring formed from a plurality of pipe joints connected together end-to-end, and then rotate the drill string so that the drill bit progresses downward into the earth to create a borehole along a predetermined trajectory. In addition to pipe joints, the drillstring typically includes heavier tubular members known as drill collars positioned between the pipe joints and the drill bit. The drill collars increase the vertical load applied to the drill bit to enhance its operational effectiveness. Other accessories commonly incorporated into drill strings include stabilizers to assist in maintaining the desired direction of the drilled borehole, and reamers to ensure that the drilled borehole is maintained at a desired gauge (i.e., diameter). In vertical drilling operations, the drillstring and drill bit are typically rotated from the surface with a top dive or rotary table.

During the drilling operations, drilling fluid or mud is pumped under pressure down the drill string, out the face of the drill bit into the borehole, and then up the annulus between the drill string and the borehole sidewall to the surface. The drilling fluid, which may be water-based or oil-based, is typically viscous to enhance its ability to carry borehole cuttings to the surface. The drilling fluid can perform various other valuable functions, including enhancement of drill bit performance (e.g., by ejection of fluid under pressure through ports in the drill bit, creating mud jets that blast into and weaken the underlying formation in advance of the drill bit), drill bit cooling, and formation of a protective cake on the borehole wall (to stabilize and seal the borehole wall).

Recently, it has become increasingly common and desirable in the oil and gas industry to drill horizontal and other non-vertical boreholes (i.e., "directional drilling"), to facilitate more efficient access to and production from larger regions of subsurface hydrocarbon-bearing formations than would be possible using only vertical boreholes. In directional drilling, specialized drill string components and "bottom hole assemblies" are used to induce, monitor, and control deviations in the path of the drill bit, so as to produce a borehole of desired non-vertical configuration.

Directional drilling is typically carried out using a downhole or mud motor incorporated into the bottom hole assembly (BHA) immediately above the drill bit. A typical downhole motor includes several primary components, such as, for example (in order, starting from the top of the motor assembly): (1) a top sub adapted to facilitate connection to the lower end of a drill string ("sub" being the common general term in the oil and gas industry for any small or secondary drill string component); (2) a power section; (3) a drive shaft enclosed within a drive shaft housing, with the upper end of the drive shaft being operably connected to the rotor of the power section; and (4) a bearing assembly (which includes a mandrel with an upper end coupled to the lower end of the drive shaft, plus a lower end adapted to receive a drill bit).

In drilling operations employing a downhole motor, drilling fluid is circulated under pressure through the drill string and back up to the surface as previously described. However, in route to the drill bit, the pressurized drilling fluid flows through the power section of the downhole motor to generate rotational torque to rotate the drill bit.

The power section is typically a progressive cavity or positive displacement motor (PD motor). In a PD motor, the rotor comprises a shaft formed with one or more helical vanes or lobes extending along its length, and the stator is formed of an elastomer liner bonded to the inner cylindrical wall of the stator housing. The liner defines helical lobes complementary to that of the rotor lobe or lobes, but numbering one more than the number of rotor lobes. The lower end of the rotor comprises an output shaft, which in turn is coupled to the upper end of a drive shaft that drives the rotation of the drill bit.

During operation of the downhole motor, high-pressure drilling fluid is forced through the power section, causing the rotor to rotate within the stator, and inducing a pressure drop across the power section (i.e., the drilling fluid pressure being lower at the bottom of the power section). The power delivered to the output shaft is proportional to the product of the volume of fluid passing through the power section multiplied by the pressure drop across the power section (i.e., from fluid inlet to fluid outlet). Accordingly, a higher rate of fluid circulation fluid through the power section results in a higher rotational speed of the rotor within the stator, and correspondingly higher power output.

As previously noted, the output shaft is coupled to the upper end of the drive shaft, for transmission of rotational torque to the drill bit. However, the motion of the rotor in a positive PD motor is eccentric in nature, or "precessional"— i.e., in operation, the lower end of the rotor (i.e., the output end) rotates or orbits about the central longitudinal axis of the stator housing. The output shaft is coupled to the upper end of the drive shaft with a first (or upper) universal joint, thereby allowing rotational torque to be transferred from the rotor to the drive shaft irrespective of the eccentric motion of the rotor or fact that the output shaft and drive shaft are not coaxially aligned.

The bearing assembly typically incorporates an elongate tubular mandrel having an upper end coupled to the lower end of the drive shaft by means of a second (or lower) universal joint, and a lower end coupled to the drill bit. The mandrel is encased in a tubular bearing housing that connects to the tubular drive shaft housing above. The mandrel rotates concentrically within the bearing housing.

The universal joint assemblies of conventional driveshafts tend to wear or fail relatively quickly during operation. In particular, many such conventional driveshafts transfer torque through either point or line contact(s), which disperse a large amount of force over a relatively small surface area, thereby tending to accelerate wear at such contact surfaces.

Accordingly, there remains a need in the art for improved universal joint assemblies for use in conjunction with downhole motors. Such universal joint assemblies would be well received if they allowed for a slower rate of wear for the various contact surfaces disposed therein, thereby allowing for a longer lifespan.

BRIEF SUMMARY OF THE DISCLOSURE

These and other needs in the art are addressed in one embodiment by a driveshaft for a downhole motor. In an embodiment, the driveshaft has a longitudinal axis and comprises a first end and a second end opposite the first end. The first end has a radially outer surface including a first connection lug and a second connection lug uniformly circumferentially-spaced from the first connection lug. The first connection lug and the second connection lug each include a cylindrical surface concentrically disposed about a first pivot axis oriented orthogonal to the longitudinal axis.

These and other needs in the art are addressed in another embodiment by a driveshaft assembly for a downhole motor. In an embodiment, the driveshaft assembly comprises a driveshaft having a longitudinal axis, a first end, and a second end opposite the first end. The first end of the driveshaft has a radially outer surface including a first connection lug, a second connection lug angularly spaced 180° from the first connection lug, a third connection lug, and a fourth connection lug angularly spaced 180° from the third connection lug. In addition, the driveshaft assembly comprises a first end housing having a central axis, a first end, a second end opposite the first end, and a receptacle extending axially from the first end. The first end of the driveshaft is disposed in the receptacle. Further, the drive shaft assembly comprises a torque transfer assembly disposed in the receptacle and radially positioned between the end housing and the first end of the driveshaft. The torque transfer assembly slidingly engages the first connection lug, the second connection lug, the third connection lug, the fourth connection lug, and the first end housing. The torque transfer assembly includes a first recess at least partially disposed about the first connection lug, a second recess at least partially disposed about the second connection lug, a third recess at least partially disposed about the third connection lug, and a fourth recess at least partially disposed about the fourth connection lug.

These and other needs in the art are addressed in another embodiment by a mud motor. In an embodiment, the mud motor comprises a power section configured to convert pressure exerted by drilling fluid into a rotational torque. In addition, the mud motor comprises a bearing assembly configured to be coupled a drill bit. Further, the mud motor comprises a driveshaft assembly disposed between the power section and the bearing assembly. The driveshaft assembly comprises a driveshaft having a longitudinal axis, a first end, and a second end opposite the first end. The first end of the driveshaft has a radially outer surface including a first connection lug, a second connection lug angularly spaced 180° from the first connection lug, a third connection lug, and a fourth connection lug angularly spaced 180° from the third connection lug. In addition, the driveshaft assembly comprises a first end housing having a central axis, a first end, a second end opposite the first end, and a receptacle extending axially from the first end. The first end of the driveshaft is disposed in the receptacle. Further, the driveshaft assembly comprises a torque transfer assembly disposed in the receptacle and radially disposed between the first end housing and the first end of the driveshaft. The torque transfer assembly includes a first torque transfer member, a second torque transfer member, a third torque transfer member, and a fourth torque transfer member. Each torque transfer member includes a body. The first and second torque transfer member each include a pair of projections extending laterally from opposite sides of the body. The body of the first torque transfer member is disposed about the first connection lug, and the body of the second torque transfer member is disposed about the second connection lug. The body of the third torque transfer member is disposed about the third connection lug, one projection of the first torque transfer member, and one projection of the second torque transfer member. The body of the fourth torque transfer member is disposed about the fourth connection lug, one projection of the first torque transfer member, and one projection of the second torque transfer member.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the disclosure, reference will now be made to the accompanying drawings in which.

DETAILED DESCRIPTION OF THE PREFERRED EMBODIMENTS

Figure 1:
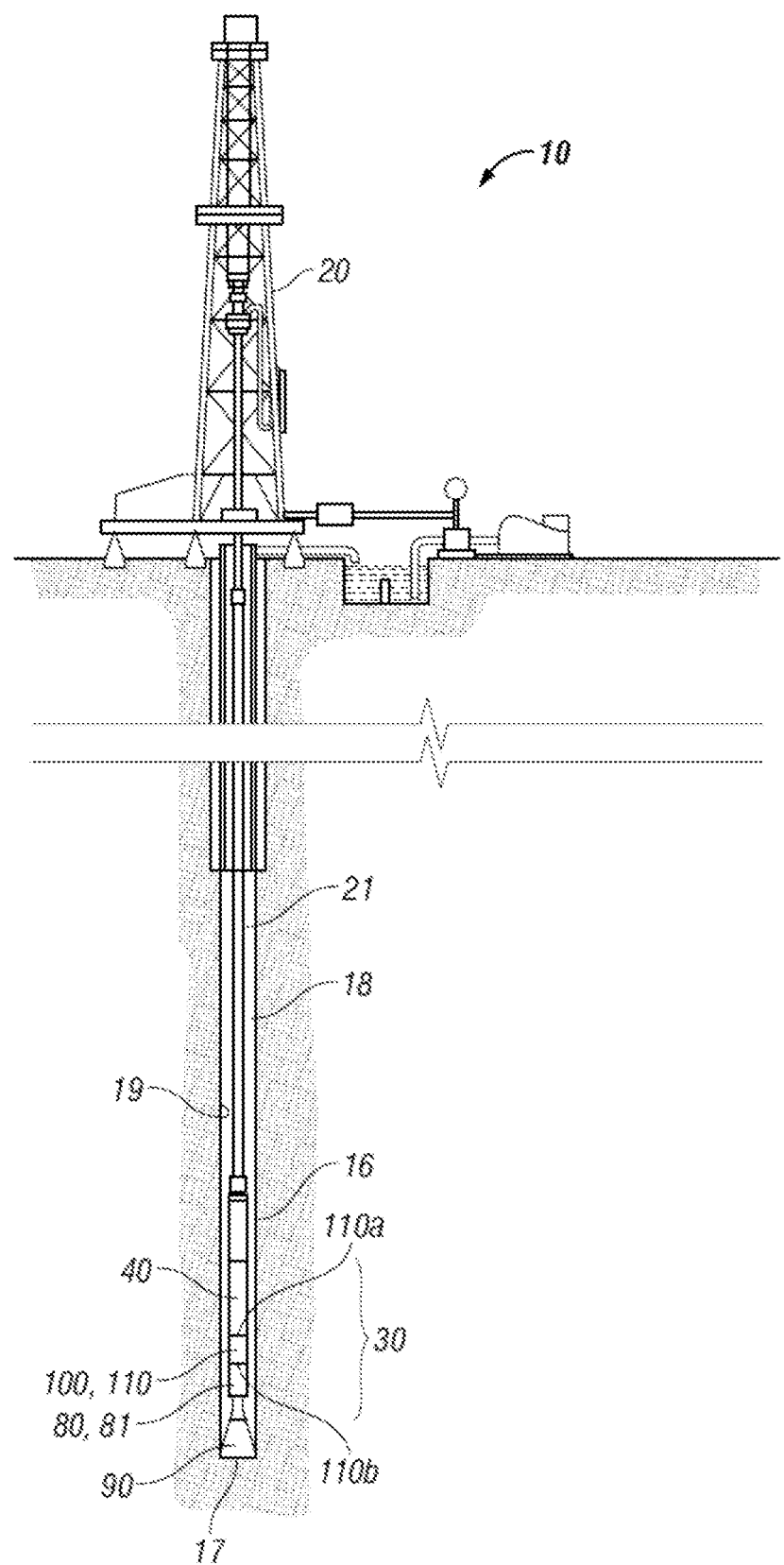
FIG. 1 is a schematic partial cross-sectional view of a drilling system including an embodiment of a driveshaft assembly in accordance with the principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation.

Referring now to FIG. 1, a system 10 for drilling a borehole 16 in an earthen formation is shown. In this embodiment, system 10 includes a drilling rig 20 disposed at the surface, a drill string 21 extending from rig 20 into borehole 16, a downhole motor 30, and a drill bit 90. Motor 30 forms a part of the bottomhole assembly ("BHA") and is disposed between the lower end of the drill string 21 and the drill bit 90. Moving downward along the BHA towards bit 90, motor 30 includes a hydraulic drive or power section 40, a driveshaft assembly 100 coupled to power section 40, and a bearing assembly 80 coupled to driveshaft assembly 100. Bit 90 is coupled to the lower end of bearing assembly 80.

The hydraulic drive section 40 converts pressure exerted by drilling fluid pumped down drill string 21 into rotational torque that is transferred through driveshaft assembly 100 and bearing assembly 80 to drill bit 90. With force or weight applied to the drill bit 90, also referred to as weight-on-bit ("WOB"), the rotating drill bit 90 engages the earthen formation and proceeds to form borehole 16 along a predetermined path toward a target zone. The drilling fluid or mud pumped down the drill string 21 and through motor 30 passes out of the face of drill bit 90 and back up the annulus 18 formed between drill string 21 and the sidewall 19 of borehole 16. The drilling fluid cools the bit 90, and flushes the cuttings away from the face of bit 90 and carries the cuttings to the surface.

Figure 2:
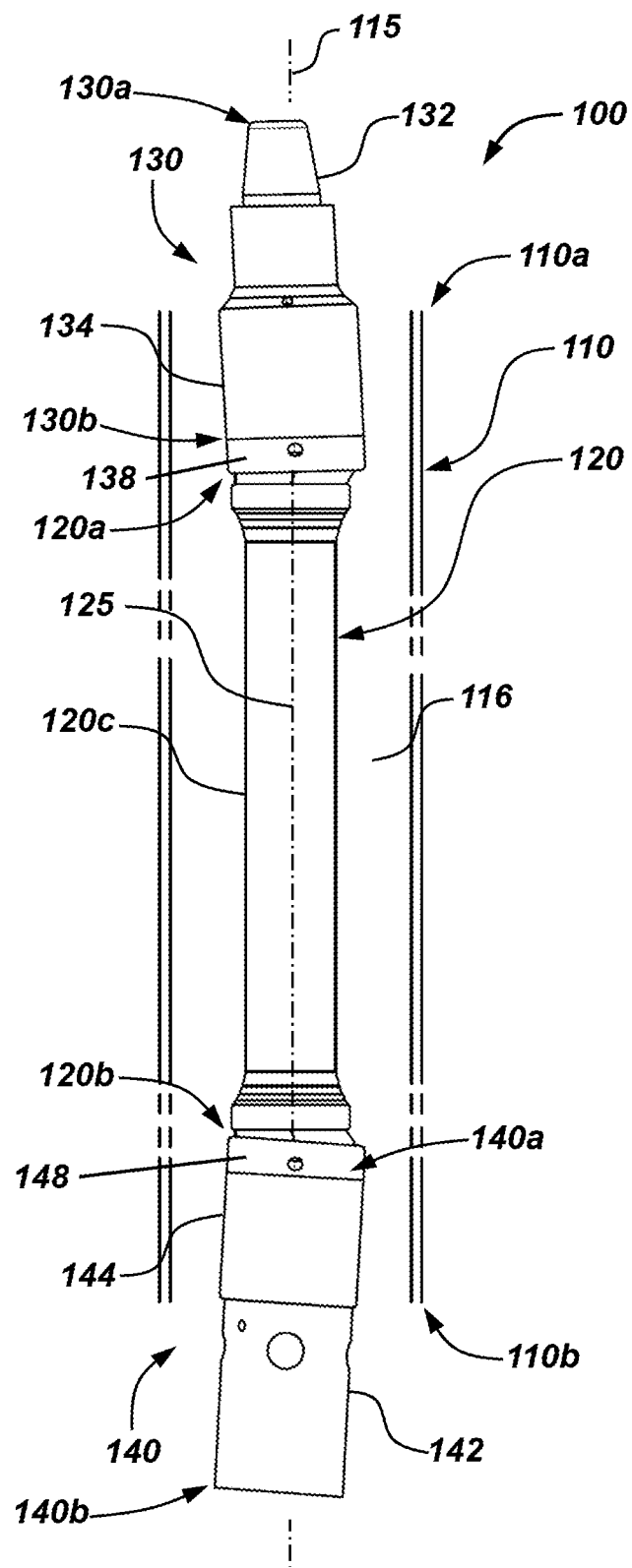
FIG. 2 is a partial cross-sectional side view of the driveshaft assembly of FIG. 1.

Referring now to FIG. 2, driveshaft assembly 100 includes an outer driveshaft housing 110, a driveshaft 120 rotatably disposed within housing 110, a first or upper end housing 130 coupled to driveshaft 120, and a second or lower end housing 140 coupled to driveshaft 120. Housing 110 is an elongate, cylindrical tubular member having a central or longitudinal axis 115, a first or upper end 110a, and a second or lower end 110b opposite upper end 110a. As is best shown in FIG. 1, in this embodiment, housing 110 is coaxially aligned with hydraulic drive section 40 and bearing assembly 80. In addition, upper end 110a of housing 110 is coupled to an outer housing of drive section 40 and lower end 110b of housing 110 is coupled to an outer housing of bearing assembly 80.

Referring still to FIG. 2, driveshaft 120 has a central or longitudinal axis 125, a first or upper end 120a, a second or lower end 120b opposite end 120a, and a generally cylindrical radially outer surface 120c extending axially between ends 120a, 120b. As will be described in more detail below, in this embodiment, axis 125 of shaft 120 is not coaxially aligned with axis 115 of housing 110. An annular space 116 is formed between drive shaft housing 110 and the driveshaft 120. During operation, drilling fluid is pumped down drill string 21 and through downhole motor 30 to drill bit 90. Within driveshaft assembly 100, drilling fluid flows through annular space 116 from upper end 110a to lower end 110b in route to bearing assembly 80 and drill bit 90.

Upper end housing 130 has a first or upper end 130a, a second or lower end 130b opposite end 130a, a connector section 132 extending from upper end 130a, and a socket section 134 extending from connector section 132 to lower end 130b. In this embodiment, connector section 132 is a male pin or pin end that connects upper end housing 130 to the output shaft of the hydraulic drive section 40. Socket section 134 receives upper end 120a of the drive shaft 120. As will be described in more detail below, the connection between upper end 120a and socket section 134 allows driveshaft 120 to pivot about end 120a relative to end housing 130 while simultaneously transferring rotational torque and axial thrust loads between end housing 130 and driveshaft 120. An annular end cap 138 is threaded into end 130b of upper end housing 130.

Lower end housing 140 has a first or upper end 140a, a second or lower end 140b, a connector section 142 extending from upper end 140a, and a socket section 134 extending from connector section 142 to the lower end 140b. In this embodiment, connector section 142 is a female box or box end that connects lower end housing the mandrel of bearing assembly 80. Socket section 144 receives lower end 120b of the driveshaft 120. As will be described in more detail below, the connection between lower end 120b and socket section 144 allows driveshaft 120 to pivot about end 120b relative to end housing 140 while simultaneously transferring rotational torque and axial thrust loads between end housing 140 and driveshaft 120. An annular end cap 148 is threaded into end 140a of lower end housing 140.

In this embodiment, ends 120a, 120b of driveshaft 120 are structurally identical, and socket sections 134, 144 are structurally identical. Therefore, in the description to follow and associated Figures, the details of lower end 120b, corresponding socket section 144, and the connection therebetween are shown and described it being understood that upper end 120a, corresponding socket section 134, and the connection therebetween are the same.

Figure 3:
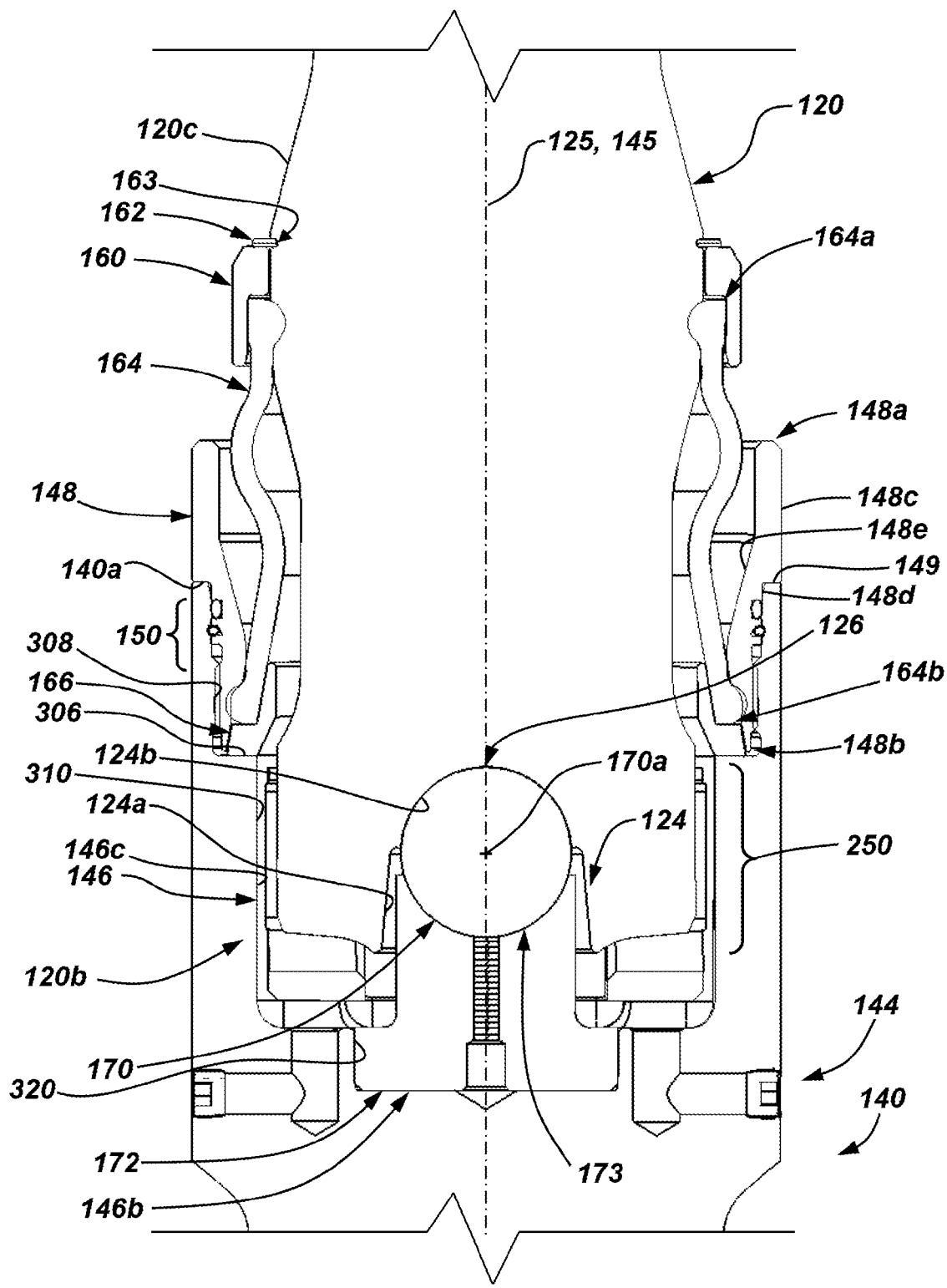
FIG. 3 is an enlarged cross-sectional side view of one of the universal joint assemblies of FIG. 1.

Referring now to FIG. 3, lower end 120b of driveshaft 120 and socket section 144 of lower end housing 140 are shown. Socket section 144 has a central or longitudinal axis 145 and includes a receptacle 146 that extends axially from end 140a and receives lower end 120b of driveshaft 120.

Figure 10:
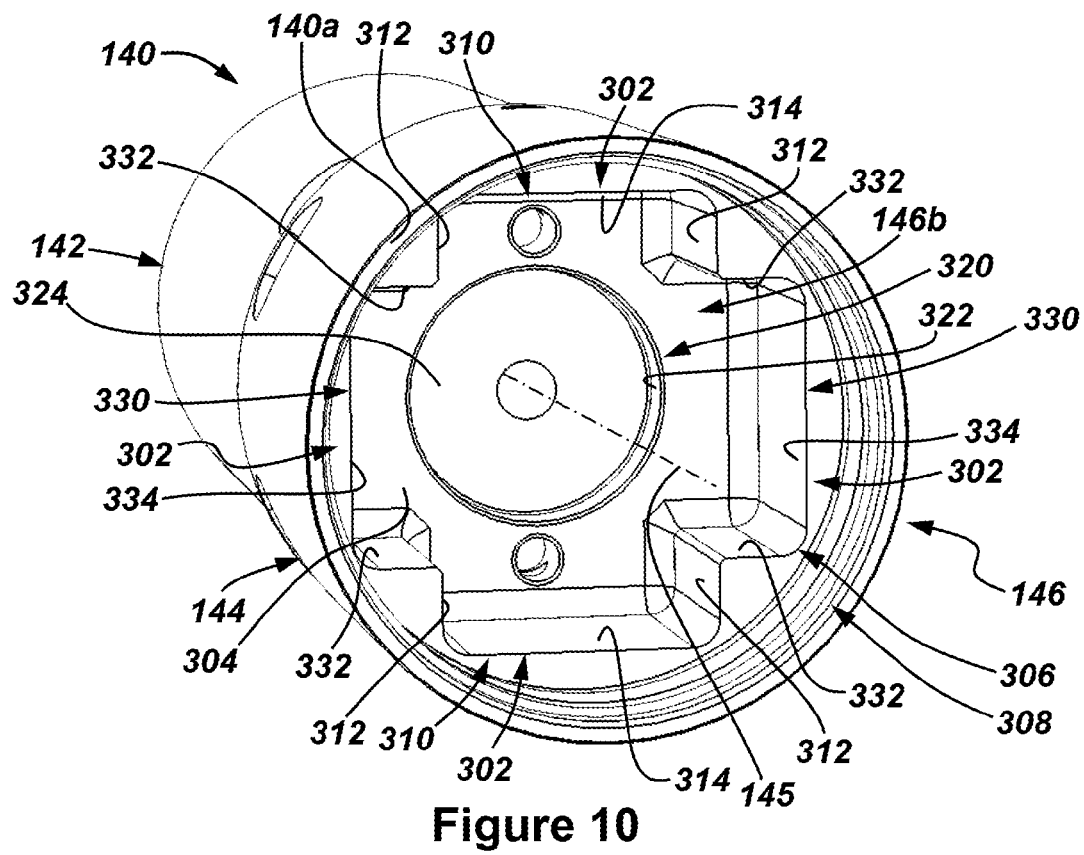
FIG. 10 is a perspective view of the receptacle of the lower end housing shown in FIG. 3.

Referring briefly to FIGS. 3 and 10, receptacle 146 is defined by a radially inner surface 146c including an upper generally cylindrical surface 308 extending axially from upper end 140a, a annular shoulder 306 extending radially inward from surface 308, a plurality of circumferentially-spaced rectangular pockets 302 extending axially from surface 308, an annular surface 304 extending radially inward from pockets 302, and a cylindrical counterbore or recess 320 extending axially from surface 304. Shoulder 306 and surface 304 are planar surfaces disposed in planes oriented perpendicular to axis 145.

Referring again to FIG. 3, end cap 148 includes a first or upper end 148a, a second or lower end 148b, a generally cylindrical outer surface 148c extending axially from upper end 148a, a generally cylindrical outer surface 148d extending axially from the lower end 148b, an outer annular shoulder 149 extending radially between surfaces 148c, d, and a radially inner surface 148e extending between ends 148a, b. End cap 148 is threaded into receptacle 146, via engagement of mating external threads on outer surface 148d and internal threads on surface 308, until shoulder 149 axially abuts end 140a. An annular seal assembly 150 is radially positioned between surfaces 148d, 308 to prevent fluid flow therebetween.

Driveshaft 120 includes a recess 124 extending axially from lower end 120b to a terminal end 126. Recess 124 is defined by a frustoconical surface 124a extending from end 120b and a concave, spherical surface 124b extending between surface 124a and end 126. A thrust ball 170 is seated within recess 124 and slidingly engages surface 124b. Thrust ball 170 has a geometric center 170a that is intersected by projections of axes 125, 145. A thrust member 172 is seated in recess 320 and extends axially into recess 124. The end of thrust member 172 disposed in recess 124 comprises a spherical, concave surface 173 that slidingly engages ball 170. Surfaces 124b, 173 are sized and shaped to mate and slidingly engage ball 170, thereby trapping ball 170 between driveshaft 120 and thrust member 172. As will be described in more detail below, drive shaft 120 is free to pivot relative to end housing 140 about center 170a of ball 170 as ball 170 slides along surfaces 124b and 173.

Referring still to FIG. 3, a torque transfer assembly 250 is also disposed within the receptacle 146 between lower end 120b of drive shaft 120 and socket section 144 of lower end housing 140. As will be described in more detail below, torque transfer assembly 250 transfers torque between end housing 140 and driveshaft 120 while allowing drive shaft 120 to pivot about center 170a relative to end housing 140.

A flexible closure boot 164 is provided to prevent drilling mud from reaching torque transfer assembly 250 and ball 170. Closure boot 164 is disposed about driveshaft 120 proximate lower end 120b and has a first or upper end 164a coupled to driveshaft 120 with a lock ring 160 and a second or lower end 164b coupled to end housing 140 with end cap 148 and an L-shaped compression ring 166. Thus, closure boot 164 extends radially between driveshaft 120 and end housing 140. More specifically, upper end 164a of boot 164 is seated in an annular recess on outer surface 120c of driveshaft 120, and lock ring 160 is disposed onto shaft 120 over end 164a, thereby holding end 164a in position between ring 160 and shaft 120 via an interference fit. A snap ring 162 is disposed in a circumferential groove 163 in outer surface 120c and axially retains ring 160 on shaft 120. Lower end 164b of boot 164 is similarly held in position via an interference fit. In particular, lower end 164b is seated in an annular recess on inner surface 148e and compressed between end cap 148 and compression ring 166 disposed in receptacle 146 and seated against shoulder 306.

Figure 4:
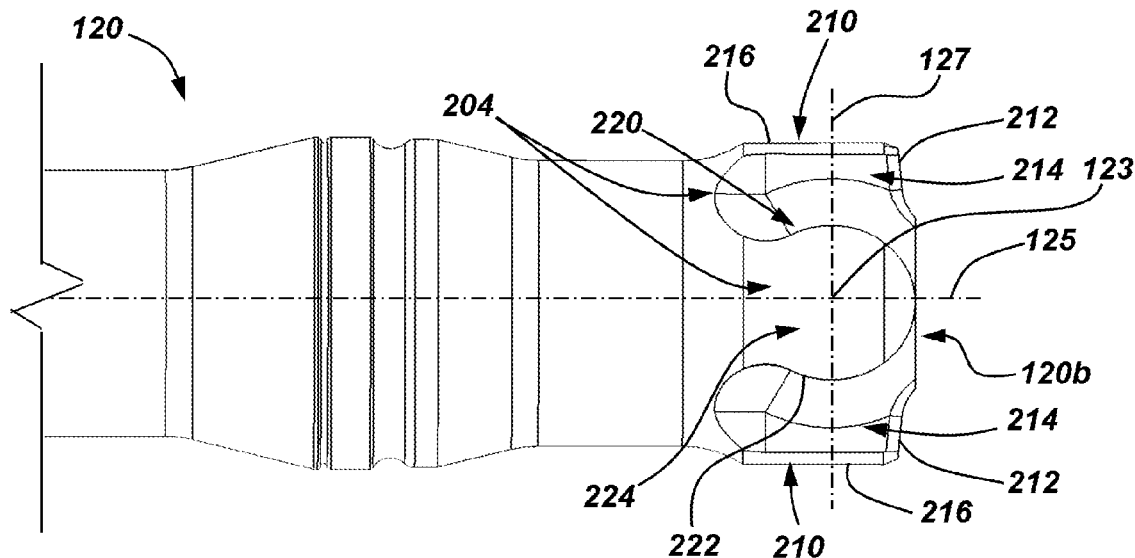
FIG. 4 is an enlarged side view of the end of the driveshaft of FIG. 3.
Figure 5:
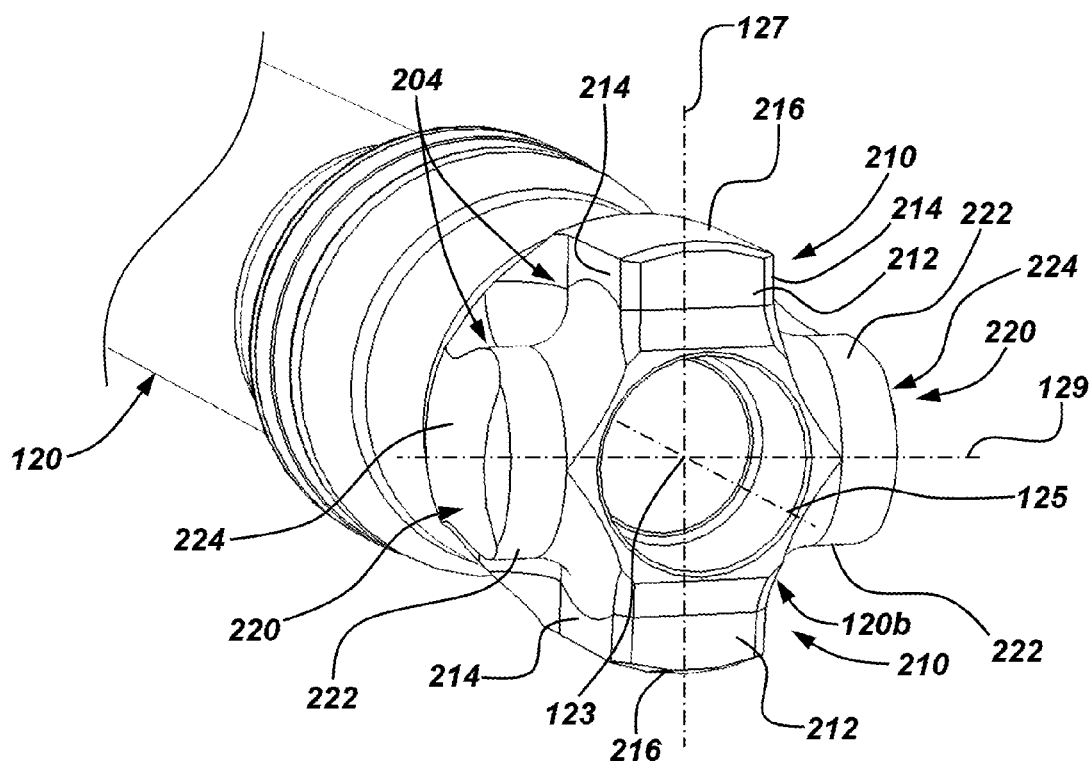
FIG. 5 is an enlarged perspective view of the end of the driveshaft of FIG. 3.

Referring now to FIGS. 4 and 5, lower end 120b of shaft 120 is shown. In this embodiment, outer surface 120c includes a plurality of circumferentially-spaced connection lugs 204 at end 120b. In particular, lower end 120b includes a total of four connection lugs 204—a pair of first connection lugs 210, and a pair of second connection lugs 220. First connection lugs 210 are uniformly angularly spaced 180° apart about axis 125, and second connection lugs 220 are uniformly angularly spaced 180° apart about axis 125. In addition, first connection lugs 210 are angularly spaced 90° apart from second connection lugs 220.

Each first connection lug 210 includes an end face or surface 212, a pair of planar lateral side surfaces 214, and an radially outer surface 216. Surfaces 214 are disposed on opposite sides of axis 127 and are oriented parallel to axes 125, 127. Each second connection lug 220 includes a convex cylindrical surface 222 and an radially outer surface 224. Cylindrical surfaces 222 define a linear pivot axis 129 extending through the opposed second connection lugs 220 and concentrically disposed within cylindrical surfaces 222. Pivot axis 129 is orthogonal to axis 125 and intersects shaft axis 125 at a center point 123. As will be described in more detail below, center 123 corresponds to the center 170a of the thrust ball 170 when driveshaft assembly 100 is fully assembled.

Figure 6:
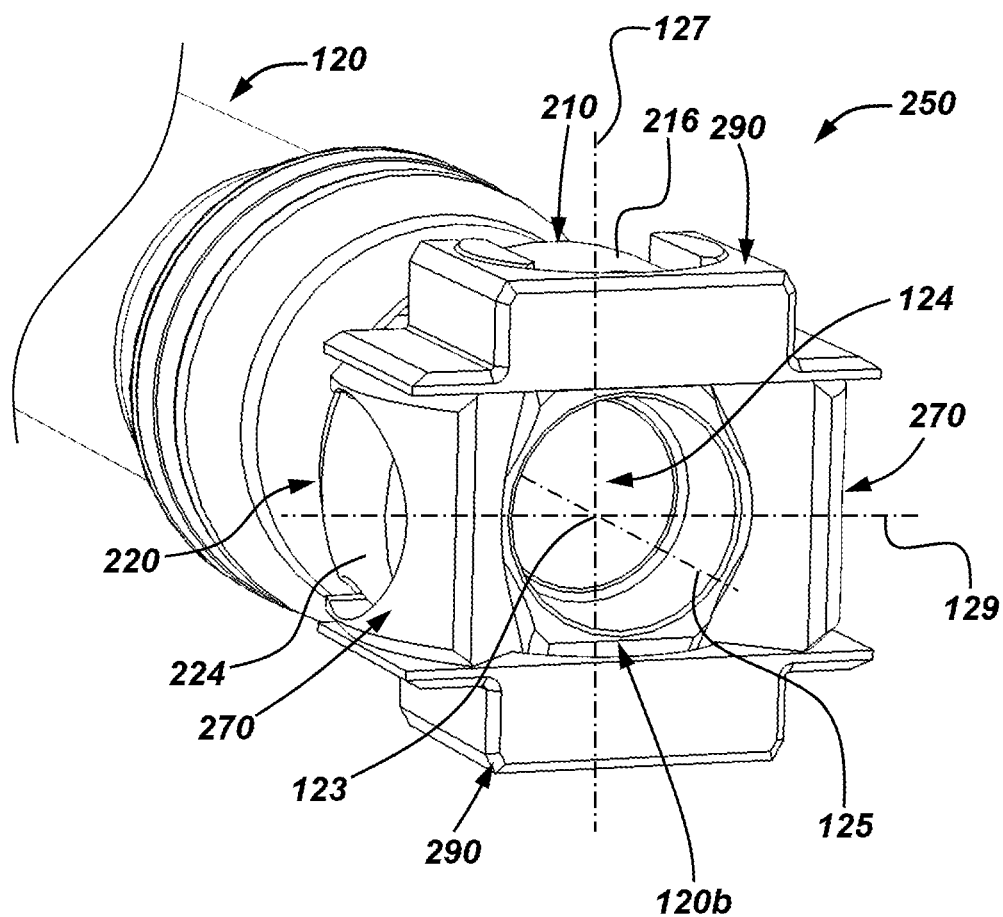
FIG. 6 is a perspective view of the end of the driveshaft and torque transfer assembly of FIG. 3.

Referring now to FIG. 6, torque transfer assembly 250 is shown disposed on lower end 120b of shaft 120. In this embodiment, torque transfer assembly 250 is formed from a plurality of discrete torque transfer members coupled together—a pair of first torque transfer members 270 and a pair of second torque transfer members 290. As will be described in more detail below, torque transfer members 270, 290 are mounted to lugs 210, 220 on end 120b, allow shaft 120 to pivot about end 120b and center 123, and transfer rotational torque between shaft 120 and end housing 140 through slidingly engaging contact surfaces.

Figure 7:
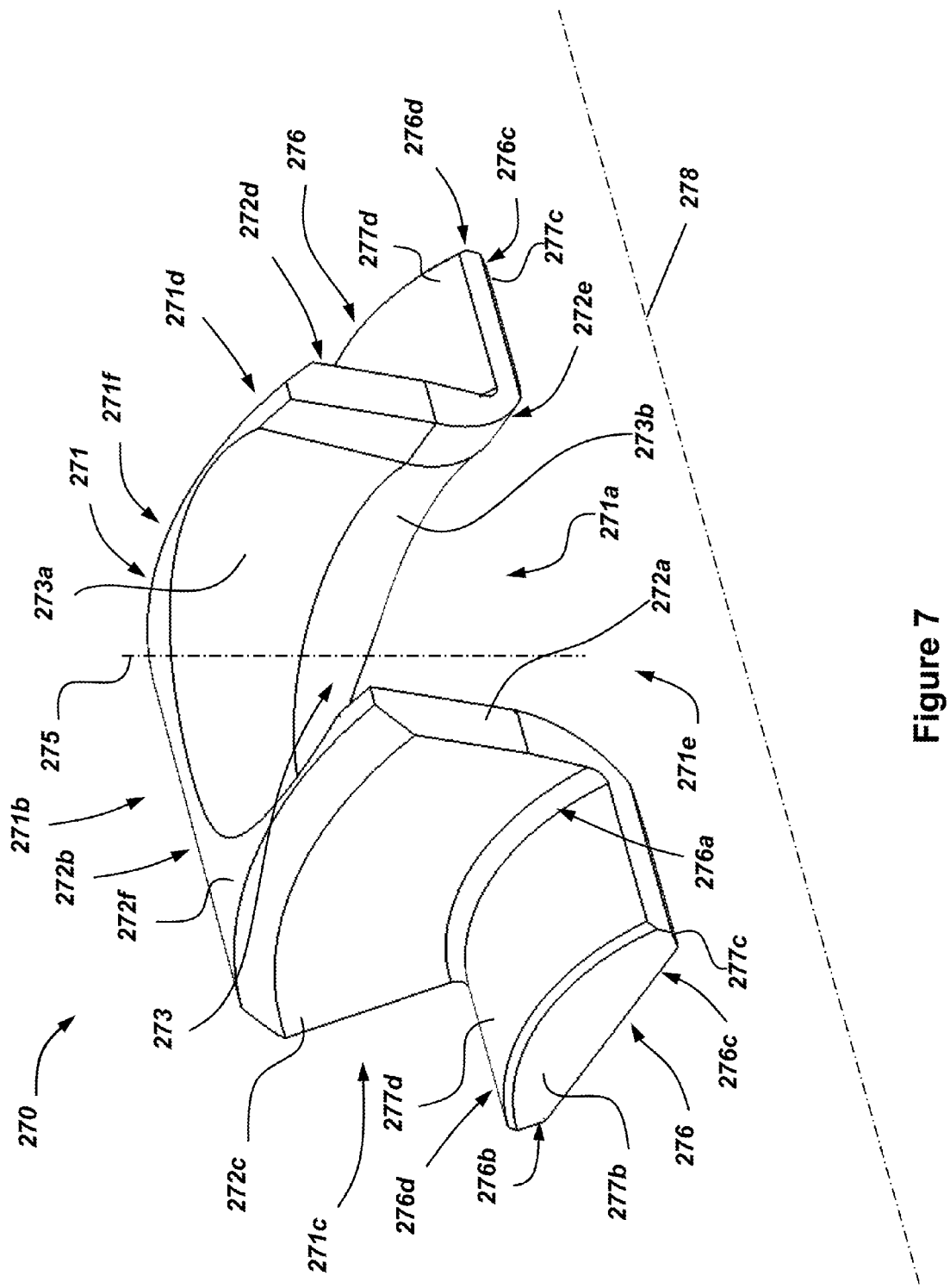
FIG. 7 is a perspective view of one of the first torque transfer members of the torque transfer assembly of FIG. 6.

Referring now to FIG. 7, a first torque transfer member 270 is shown, it being understood that each torque transfer member 270 is the same. In this embodiment, first torque transfer member 270 includes a generally C-shaped body 271 having a central axis 275 and a pair of projections 276 extending radially in opposite directions from body 271. Body 271 has a first or front side 271a, a second or rear side 271b, a pair of lateral sides 271c, 271d, a bottom side 271e, and a top side 271f. When member 270 is mounted to shaft 120, bottom side 271e engages shaft 120, and top side 271f is distal shaft 120. Consequently, bottom side 271e may also be described as "inner" side 271e and top side 271f may be also be described as "outer" side 271f.

Each side 271a, 271b, 271c, 271d, 271e, 271f is defined by a corresponding surface 272a, 272b, 272c, 272d, 272e, 272f, respectively. Lateral surfaces 272c, 272d are planar and parallel to each other and axis 275. Bottom surface 272e is planar, and top surface 272f is convex and cylindrical. In particular, top surface 272f extends about an axis oriented perpendicular to surfaces 272c, 272d and intersects axis 275. Bottom surface 272e is perpendicular to lateral surfaces 272c, 272d. Further, the surfaces 272a, b are oriented perpendicular to lateral surfaces 272c, 272d.

A recess 273 extends radially inward through front surface 272a into body 271 and intersects both top and bottom surfaces 272f, 272e. Recess 273 includes a cylindrical surface 273a extending axially from top surface 272f and a radiused surface 273b extending axially from cylindrical surface 273a to bottom surface 272e. Cylindrical surface 273a is concentrically disposed about axis 275. As will be described in more detail below, when member 270 is mounted to shaft 120, axis 275 is coaxially aligned with axis 129 and cylindrical surface 273a slidingly engages mating cylindrical surface 222 of one lug 220.

Figure 9:
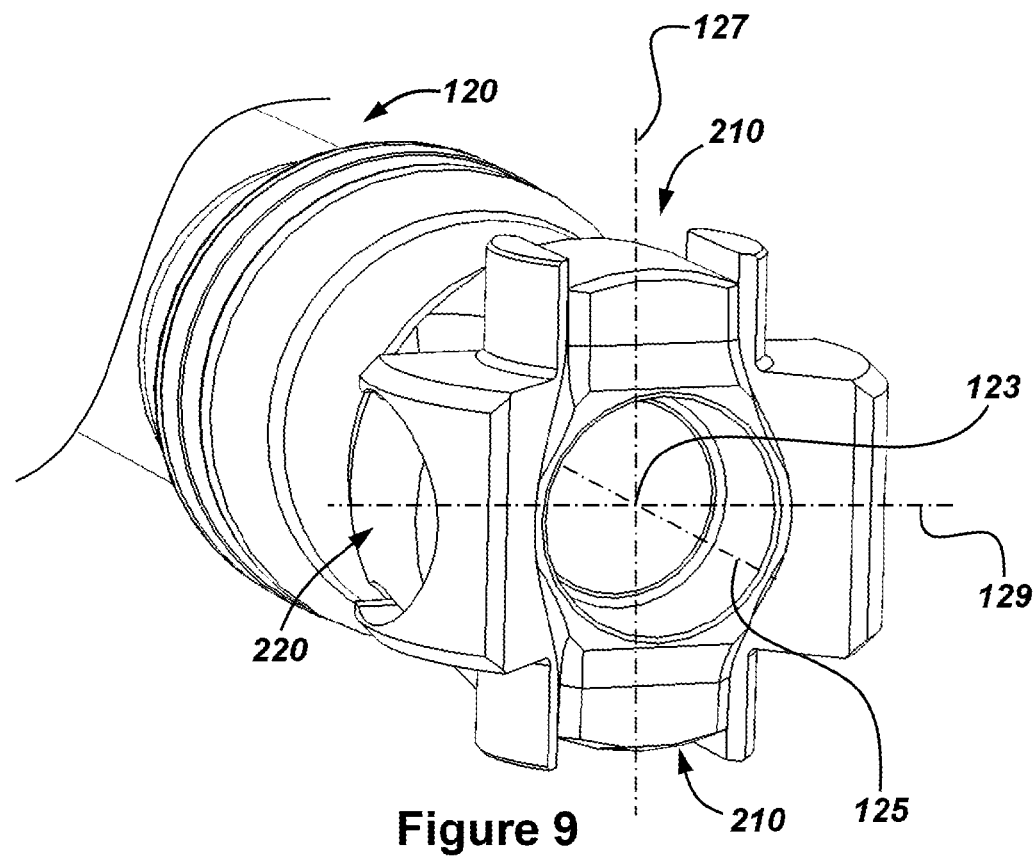
FIG. 9 is a perspective view of the end of the driveshaft of FIG. 3 with the pair of first torque transfer members mounted thereto.

Projections 276 extend laterally and radially outward from sides 271c, 271d proximal lower side 271e. Each projection 276 has a first or inner end 276a integral with body 271, a second or outer end 276b distal body 271, a bottom side 276c, and a top side 276d. Ends 276b, bottom sides 276c, and top sides 276d have corresponding surfaces 277b, 277c, 277d, respectively. In this embodiment, end surfaces 277b are planar, bottom surfaces 277c are planar, and top surfaces 277d are convex and cylindrical. In particular, end surfaces 277b are parallel to side surfaces 272c, 272d, bottom surfaces 277c are contiguous with and lie in the same plane as bottom surface 272e, and top surfaces 277d are axially spaced below and oriented concentric to top surface 272f. Each top surfaces 277d has a radius of curvature measured radially from an axis 278 that extends parallel to projections 276 and perpendicularly intersects axis 275. As will be described in more detail below, when members 270 are mounted to shaft 120 as shown in FIGS. 6 and 9, axes 278 are coaxially aligned and define a pivot axis 127 extending through the opposed first connection lugs 210. Axes 127, 129 lie in a common plane, are orthogonal to each other, and intersect at center point 123. Thus, axes 125, 127, 129 all intersect at center 123.

Figure 8:
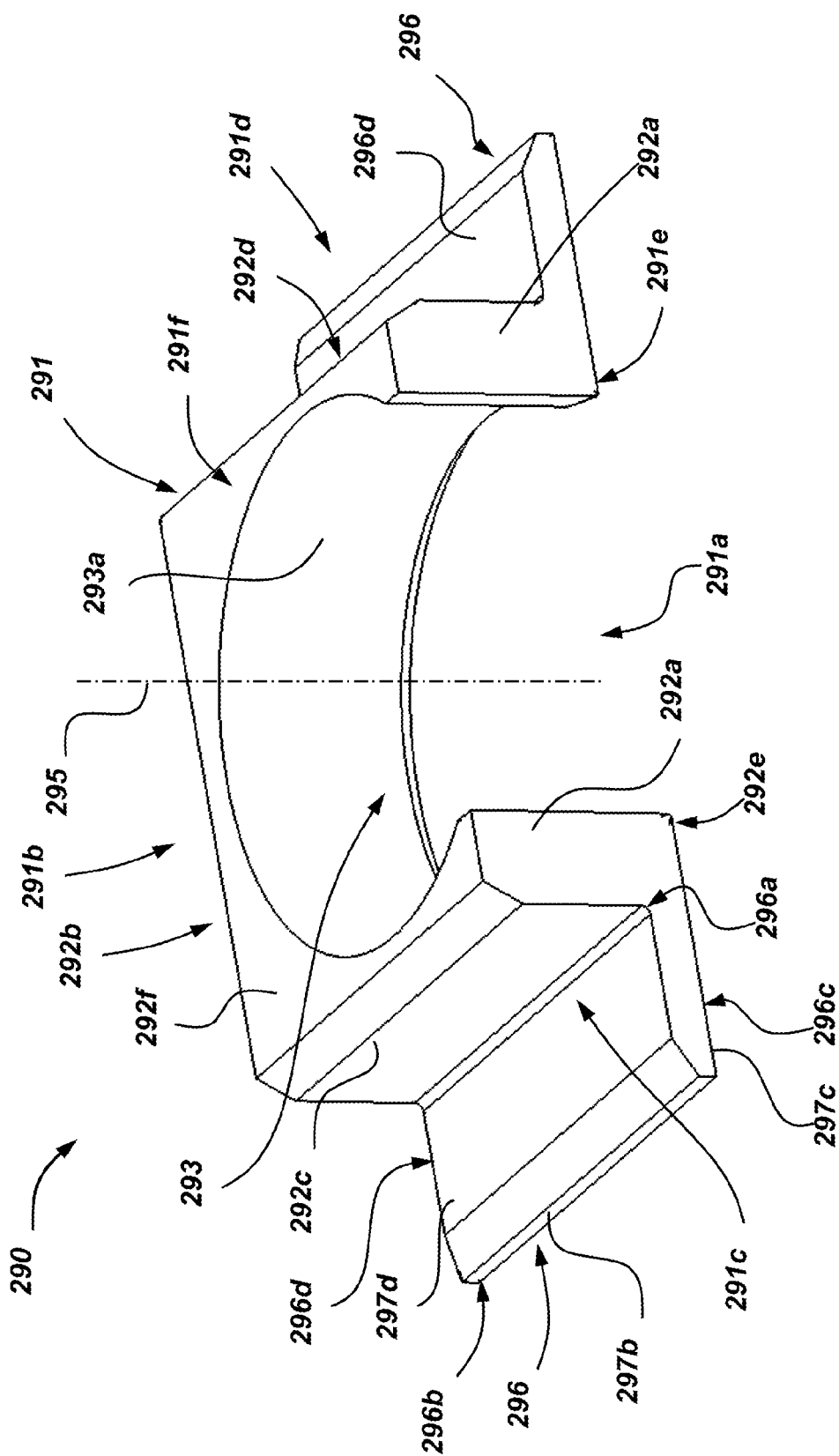
FIG. 8 is a perspective of one of the second torque transfer members of the torque transfer assembly of FIG. 6.

Referring now to FIG. 8, a second torque transfer member 290 is shown, it being understood that each torque transfer member 290 is the same. In this embodiment, second torque transfer member 290 includes a generally C-shaped body 291 having a central axis 295 and a pair of projections 296 extending radially in opposite directions from body 291. Body 291 has a first or front side 291a, a second or rear side 291b, a pair of lateral sides 291c, 291d, a bottom side 291e, and a top side 291f. When member 290 is mounted to shaft 120, bottom side 291e is proximal axis 125 of shaft 120, and top side 291f is distal axis 125 of shaft 120. Consequently, bottom side 291e may also be described as "inner" side 291e and top side 291f may be also be described as "outer" side 291f.

Each side 291a, 291b, 291c, 291d, 291e, 291f is defined by a corresponding surface 292a, 292b, 292c, 292d, 292e, 292f, respectively. Front and rear surfaces 292a, 292b are planar, parallel to each other, and parallel to axis 295. Lateral surfaces 292c, 292d are planar, parallel to each other, and parallel to axis 295, but oriented perpendicular to surfaces 292a, 292b. Bottom and top surfaces 292e, 292f are planar and parallel to each other, but lie in planes oriented perpendicular to axis 295.

A recess 293 extends radially inward through front surface 292a into body 291 and intersects both top and bottom surfaces 292f, 292e. Recess 293 includes a cylindrical surface 293a extending axially from top surface 292f to bottom surface 292e. Cylindrical surface 293a is concentrically disposed about axis 295. As will be described in more detail below, when member 290 is mounted to shaft 120, axis 295 is coaxially aligned with axes 127, 278 and cylindrical surface 293a slidingly engages mating cylindrical surfaces 277d of members 270.

Projections 296 extend laterally and radially outward from sides 291c, 291d proximal lower side 291e. Each projection 296 has a first or inner end 296a integral with body 291, a second or outer end 296b distal body 291, a bottom side 296c, and a top side 296d. Ends 296b, bottom sides 296c, and top sides 296d have corresponding surfaces 297b, 297c, 297d, respectively. In this embodiment, end surfaces 297b are planar, bottom surfaces 297c are planar, and top surfaces 297d are planar. In particular, end surfaces 297b are parallel to side surfaces 292c, 292d, bottom surfaces 297c are contiguous with and lie in the same plane as bottom surface 292e, and top surfaces 297d are axially spaced below and oriented parallel to surfaces 297c, 292f.

Referring now to FIGS. 6 and 9, to makeup torque transfer assembly 250, first torque transfer members 270 are installed on lower end 120b of driveshaft 120. Thereafter, second torque transfer members 290 are installed onto the lower end 120b of driveshaft 120 and first torque transfer members 270. In this embodiment, first torque transfer members 270 are radially advanced and mounted onto end 120b, and then second torque transfer members 290 are radially advanced and mounted onto members 270 and end 120b. Each of these installation or makeup steps will now be discussed in turn.

Referring to FIGS. 7 and 9, initially, first torque transfer members 270 are installed onto the lower end 120b of driveshaft 120. In particular, each member 270 is disposed on the lower end 120b such that recess 273 of each member 270 receives one of the second connection lugs 220, axes 129, 275 are coaxially aligned, axes 278 of members 270 are coaxially aligned, cylindrical surface 273a of each member 270 slidingly engages mating cylindrical surface 222 of one of the lugs 220, and each planar surface 277c slidingly engages one planar surface 214.

Referring again to FIGS. 6 and 8, once first torque transfer members 270 are installed onto lower end 120b of driveshaft 120, second torque transfer members 290 are installed onto the lower end 120b and first torque transfer members 270. In particular, each member 290 is disposed on the lower end 120b such that recess 293 of each member 290 receives one of the first connection lugs 210, axes 127, 295 are coaxially aligned, cylindrical surface 293 of each member 290 slidingly engages mating curved surfaces 277d of members 270 disposed about the corresponding lug 210, and planar surfaces 297c of each member 290 slidingly engage one planar surface 272c, 272d of the members 270.

Referring now to FIG. 10, as previously described, receptacle 146 is defined by a radially inner surface 146c including a cylindrical surface 308 extending axially from end 140a, a plurality of circumferentially spaced pockets 302 disposed about axis 125, annular shoulder 306 extending radially from surface 308 to pockets 302, planar surface 304 extending radially from pockets 302, and cylindrical recess 320 extending axially from surface 304. In this embodiment, four uniformly circumferentially-spaced pockets 302 are provided a pair of first pockets 310, and a pair of second pockets 330. Pockets 310 are angularly spaced 180° apart about axis 145, and thus, are radially opposed; and pockets 330 are angularly spaced 180° apart about axis 145, and thus, are radially opposed. Pockets 310 are angularly spaced 90° apart from pockets 330 about axis 145.

Each pocket 310 is identical and is defined by a pair of planar lateral or side surfaces 312 and a planar radially outer surface 314 extending between surfaces 312. Each surface 312, 314 extends axially between surfaces 304, 306. Further, each pockets 330 is identical and is defined by a pair of planar lateral or side surfaces 332 and a planar radially outer surface 334 extending between surfaces 332. Each surface 332, 334 extends axially between surfaces 304, 306. In this embodiment each pocket 310 is identical to each second pocket 330.

Recess 320 extends axially from surface 304 and is defined by a cylindrical surface 322 and a planar terminal surface 324. Cylindrical surface 322 is coaxially aligned with axis 145 and extends axially between surfaces 304, 324, while surface 324 is oriented perpendicular to axis 145. As will be explained in more detail below, the recess 320 is configured to house thrust member 172 during operations.

Figure 11:
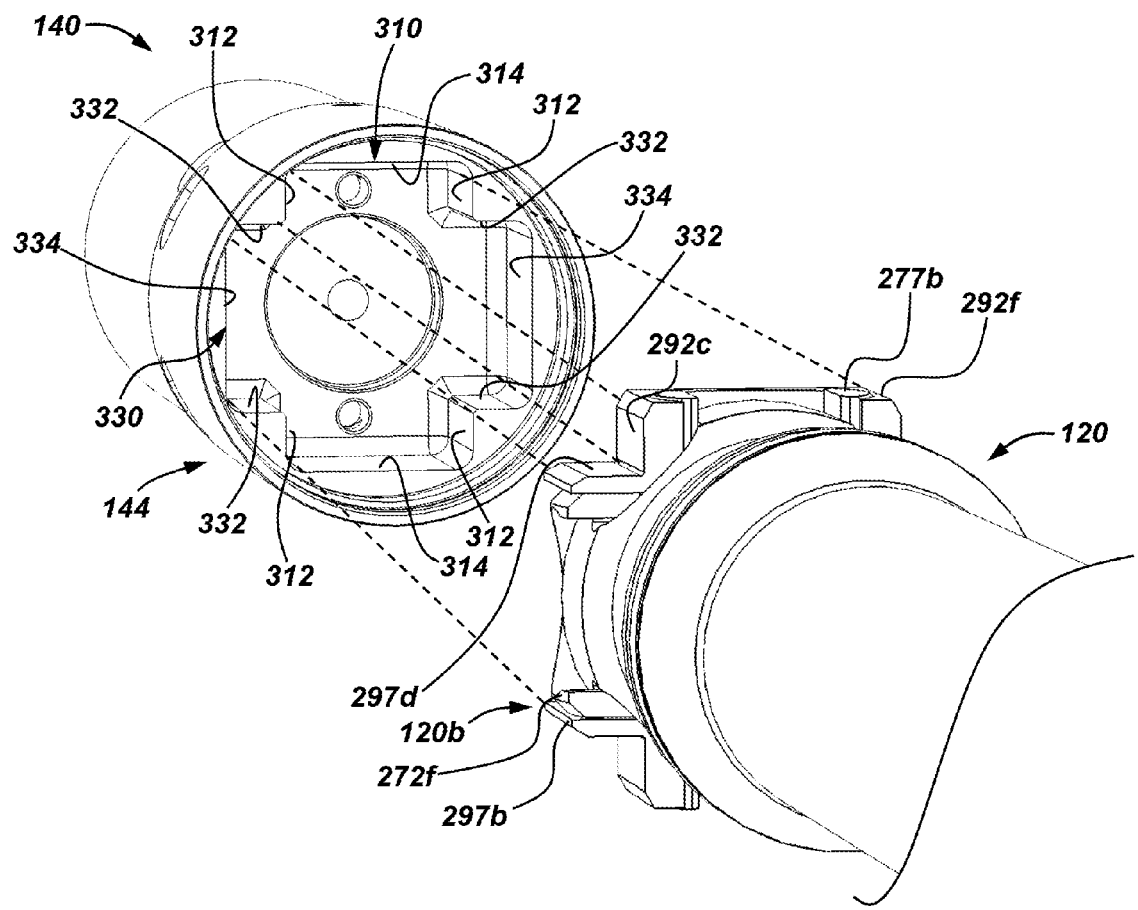
FIG. 11 is a perspective view illustrating the assembly of the universal joint assembly of FIG. 3.

Referring now to FIG. 11, to makeup lower end 120b, torque transfer assembly 250 and lower end housing 140, torque transfer assembly 250 is coupled to lower end 120b of shaft 120 as previously described, and then the end 120b with torque transfer assembly 250 mounted thereto is received within receptacle 146 of end housing 140. In particular, surfaces 292c slidingly engage mating surfaces 312 of pockets 310, surfaces 292f, 277b radially oppose surfaces 314, surfaces 297d slidingly engage mating surfaces 332, and surfaces 297b, 272f radially oppose surfaces 334. The same process is employed to makeup upper end 120a, its corresponding torque transfer assembly 250, and upper end housing 130. A clearance gap is provided between surfaces 292f, 277b opposed surfaces 314, and a clearance gap is provide between surfaces 297b, 272f and opposed surfaces 334.

Referring now to FIGS. 2, 3, and 11, once driveshaft assembly 100 is assembled, driveshaft 120 is free to pivot relative to lower end housing 140 about center 170a of thrust ball 170, while rotating about axis 125. In particular, as shaft 120 rotates about axis 125, end 120b of shaft 120 can pivot about axis 129 through sliding engagement of mating cylindrical surfaces 222, 273a and pivot about axis 127 through sliding engagement of mating cylindrical surfaces 277d, 293a. In addition, during rotation of shaft 120 about axis 125, torque is transferred between lower end 120b and end housing 140 via torque transfer assembly 250. In particular, torque is transferred between end housing 140 and lugs 210 through engagement of surfaces 214, 277c, surfaces 277d, 293a, and surfaces 292c, 292d, 312; and torque is transferred between end housing 140 and lugs 220 through engagement of surfaces 222, 273a, surfaces 272c, 272d, 297c, and surfaces 297d, 332. In this embodiment, the coupling between upper end housing 130 and upper end 120a of driveshaft 120 is structurally and functionally the same as the coupling between lower end housing 140 and lower end 120b of driveshaft 120 described above.

Through engagement of such mating surfaces, driveshaft assembly 100 enables the transfer of torque through direct, face-to-face contact surfaces as opposed to point or line contacts. Moreover, face-to-face surface contact is maintained between orthogonal pairs of mating torque transfer components, sharing the load between four load transfer interfaces throughout 360° of rotation. Torque transfer through such direct face-to-face contact surfaces offers the potential to greatly reduce the rate of wear between the interacting surfaces and thereby increases the running life of the assembly 100 and other related components.

While the drive shaft 120 has been described and disclosed herein as including a total of four connections lugs (e.g., two first connection lugs 210 and two second connection lugs 220) each arranged approximately 90° from one another, in other embodiments, the number and the arrangement of the connection lugs can vary. For example, in other embodiments, there may be more or less than four total connection lugs while still complying with the principles disclosed herein. However, the connections lugs on the end of the driveshaft are preferably arranged in pairs spaced 180° apart (e.g., one pair of connection lugs, three pairs of connection lugs, etc.). Similarly, while the receptacle (e.g., receptacle 146) of the connection section (e.g., section 144) has been described herein as including a total of four pockets (e.g., pockets 302) each arranged approximately 90° from one another, in other embodiments, the number and arrangement of the pockets can vary to accommodate variations in the number of connection lugs.

Figure 12:
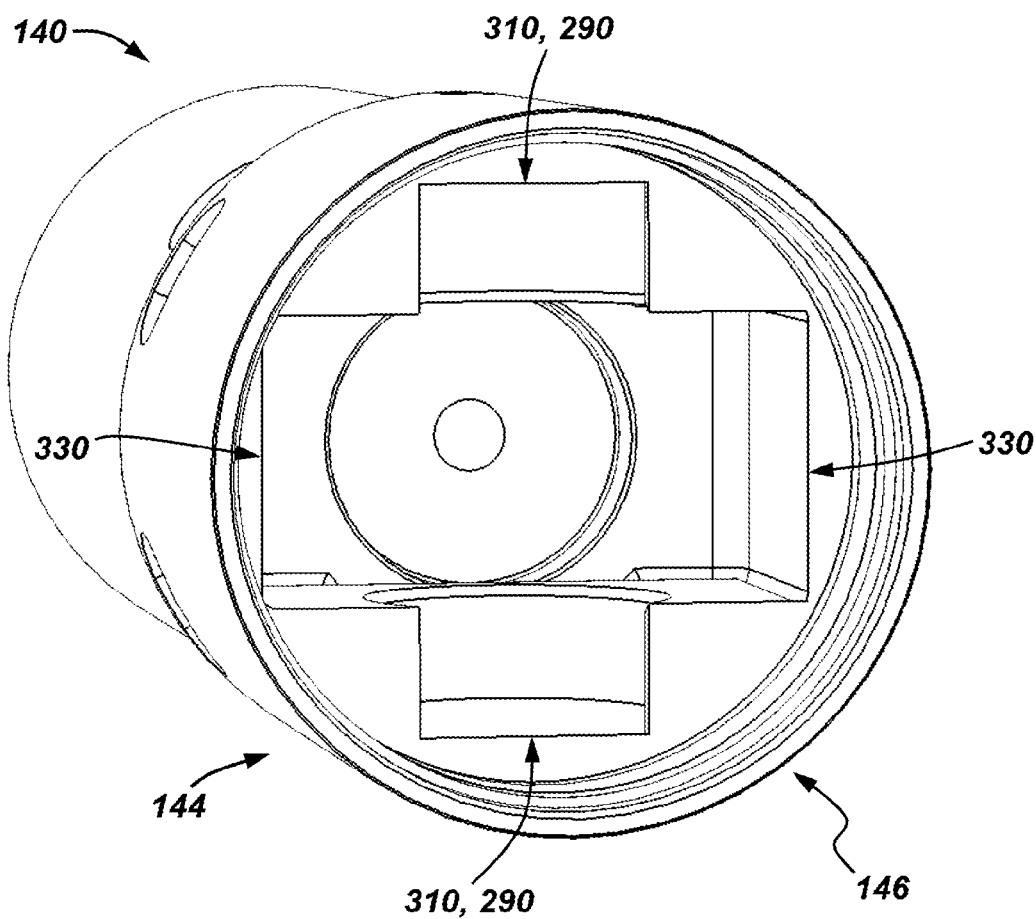
FIG. 12 shows a perspective view of an embodiment of the receptacle of the lower end housing wherein two of the torque transfer members are integrally formed therein.

As previously described, torque transfer assembly 250 includes four discrete and separate torque transfer members 270, 290 (a pair of torque transfer members 270 and a pair of torque transfer members 290), and further, torque transfer members 270, 290 are radially mounted onto lugs 210, 220 of shaft 120. However, in other embodiments, the torque transfer assembly can be formed from more or fewer than four discrete and separate components. For example, the torque transfer assembly can be formed from two discrete and separate components that are mounted onto the driveshaft (e.g., the pair of first torque transfer members 270 are formed as a single unitary component, and the pair of second torque transfer members 290 are formed as a single unitary component). In embodiments where two or more torque transfer members are formed as a single unitary component, the geometry of the recesses in the torque transfer members (e.g., recesses 273, 293) are adjusted to extend no more than 180° to enable the torque transfer members to be axially advanced and mounted onto the end of the driveshaft. In some embodiments, torque transfer members 270 may be formed as more than two discrete components. For example, projections 276 may be formed as separate components from the bodies 271. Further, each of the projections 276 may be integrally formed on the surfaces 214 of the lugs 210. Still further, in some embodiments, torque transfer members 290 are be formed without projections 296, such that surface 272c slidingly engage mating surfaces 332. Additionally, in some embodiments, the torque transfer members 290 may be integrally formed with the receptacle 146. For example, with reference to FIG. 12, in some embodiments, torque transfers members 290 may be integrally formed with the pockets 310 disposed in receptacle 146.

Still further, in other embodiments, the pair of second torque transfer members (e.g., members 290) are each integrally formed within the first pockets (e.g., pockets 302) disposed within the receptacle (e.g., receptacle 146) of the connection section (e.g., section 144). Still further, while in the embodiments described herein have described the shaft as having an identical torque transfer assembly (e.g., assembly 100) disposed on both ends (e.g., ends 120a, b) of the driveshaft (e.g., shaft 120), in other embodiments, the torque transfer assembly may not be identically configured on each of the ends of the driveshaft, and in other embodiments, only one torque transfer assembly may be included on one of the ends of the driveshaft, all while still complying with the principles disclosed herein.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

The invention claimed is:

1. A driveshaft for a downhole motor, the driveshaft having a longitudinal axis and comprising:
 a first end;
 a second end opposite the first end;
 wherein the first end has a radially outer surface including:
  a first connection lug;

a second connection lug uniformly circumferentially-spaced from the first connection lug;
a third connection lug; and
a fourth connection lug uniformly circumferentially-spaced from the third connection lug
wherein the first connection lug and the second connection lug each include a cylindrical surface concentrically disposed about a first pivot axis oriented orthogonal to the longitudinal axis;
wherein the third connection lug and the fourth connection lug each include a pair of parallel planar side surfaces; and
a first recess extending axially from the first end and including a spherical concave surface configured to receive and slidingly engage a thrust ball.

2. The driveshaft of claim 1, wherein the pair of parallel planar side surfaces of the third connection lug and the fourth connection lug are disposed on opposite sides of a second pivot axis; and wherein the second pivot axis is orthogonal to the first pivot axis and intersects the first pivot axis and the longitudinal axis at a first point.

3. The driveshaft of claim 2, wherein the second end has a radially outer surface including:
a fifth connection lug;
a sixth connection lung uniformly circumferentially-spaced from the fifth connection lug;
a seventh connection lug; and
a eighth connection lug uniformly circumferentially-spaced from the seventh connection lug;
wherein the fifth connection lug and the sixth connection lug each include a pair of parallel planar side surfaces; and
wherein the seventh connection lug and the eighth connection lug each include a cylindrical surface concentrically disposed about a third pivot axis oriented orthogonal to the longitudinal axis.

4. The driveshaft of claim 3, wherein the fifth connection lug is circumferentially spaced 90° from the seventh connection lug and the eighth connection lug.

5. The driveshaft assembly of claim 3, wherein the parallel planar side surfaces of the fifth connection lug and the sixth connection lug are disposed on opposite sides of a fourth pivot axis; wherein the fourth pivot axis is orthogonal to the third pivot axis and intersects the third pivot axis and the longitudinal axis at a second point, and wherein the second point is axially spaced from the first point.

6. A driveshaft assembly for a downhole motor, the driveshaft assembly comprising:
a driveshaft having a lonitudinal axis, a first end, and a second end opposite the first end;
wherein the first end has a radially outer surface including:
a first connection lug;
a second connection lug uniformly circumferentially spaced from the first connection lug;
a third connection lug; and
a fourth connection lug uniformly circumferentially spaced from the third connection lug;
wherein the first connection lug and the second connection lug each include a cylindrical surface concentrically disposed about a first pivot axis oriented orthogonal to the longitudinal axis;
wherein the third connection lug and the fourth connection lug each include a pair of parallel planar side surfaces disposed on opposite sides of a second pivot axis; and
wherein the second pivot axis is orthogonal to the first pivot axis and intersects the first pivot axis and the longitudinal axis at a first point; and
a first end housing having a central axis, a first end, a second end opposite the first end, and a receptacle extending axially from the first end, wherein the first end of the driveshaft is disposed in the receptacle;
wherein the driveshaft is configured to pivot about of the first pivot axis and the second pivot axis relates to the first end housing.

7. The driveshaft assembly of claim 6, wherein the first connection lug is angularly spaced 90° from the third connection lug and the fourth connection lug.

8. The driveshaft assembly of claim 6, wherein the second end has a radially outer surface including:
a fifth connection lug;
a sixth connection lung uniformly circumferentially-spaced from the fifth connection lug;
a seventh connection lug; and
a eighth connection lug uniformly circumferentially-spaced from the seventh connection lug;
wherein the fifth connection lug and the sixth connection lug each include a pair of parallel planar side surfaces; and
wherein the seventh connection lug and the eighth connection lug each include a cylindrical surface concentrically disposed about a third pivot axis oriented orthogonal to the longitudinal axis.

9. The driveshaft assembly of claim 8, wherein the fifth connection lug is angularly spaced 90° from the seventh connection lug and the eighth connection lug.

10. The driveshaft assembly of claim 8, wherein the parallel planar side surfaces of each of the fifth connection lug and the sixth connection lug are disposed on opposite sides of a fourth pivot axis;
wherein the fourth pivot axis is orthogonal to the third pivot axis and intersects the third pivot axis and the longitudinal axis at a second point; and
wherein the second point is axially spaced from the first point.

11. A driveshaft assembly for a downhole motor, the driveshaft assembly comprising:
a driveshaft having a longitudinal axis, a first end, and a second end opposite the first end;
wherein the first end of the driveshaft has a radially outer surface including:
a first connection lug;
a second connection lug uniformly circumferentially spaced from the first connection lug;
a third connection lug; and
a fourth connection lug uniformly circumferentially spaced from the third connection lug;
wherein the first connection lug and the second connection lug each include a cylindrical surface concentrically disposed about a first pivot axis oriented orthogonal to the longitudinal axis;
wherein the third connection lug and the fourth connection lug each include a pair of parallel planar surfaces disposed on opposite sides of a second pivot axis; and
wherein the first pivot axis is orthogonal to the first pivot axis and intersects the first pivot axis and the longitudinal axis at a point; and
a first end housing having a central axis, a first end, a second end opposite the first end, and a receptacle extending axially from the first end, wherein the first end of the driveshaft is disposed in the receptacle;

a torque transfer assembly disposed in the receptacle and radially positioned between the first end housing and the first end of the driveshaft;

wherein the torque transfer assembly slidingly engages the first connection lug, the second connection lug, and the first end housing;

wherein the torque transfer assembly includes a first recess at least partially disposed about the first connection lug, and a second recess at least partially disposed about the second connection lug; and wherein the driveshaft is configured to pivot about each of the first pivot axis and the second pivot axis relative to the first end housing.

12. The driveshaft assembly of claim 11, wherein the first recess includes a cylindrical surface that slidingly engages the cylindrical surface of the first connection lug, wherein the second recess includes a cylindrical surface that slidingly engages the cylindrical surface of the second connection lug, wherein the torque transfer assembly further includes a third recess at least partially disposed about the third connection lug, and a fourth recess at least partially disposed about the fourth connection lug, and wherein the third recess and the fourth recess each include a cylindrical surface.

13. The driveshaft assembly of claim 12, wherein the torque transfer assembly includes
a first torque transfer member;
a second torque transfer member;
a third torque transfer member; and
a fourth torque transfer member;
wherein each torque transfer member includes a body and wherein the first and second torque transfer members each further include a pair of projections extending laterally from opposite sides of the body;
wherein the body of the first torque transfer member includes the first recess, the body of the second torque transfer member includes the second recess, the body of the third torque transfer member includes the third recess, and the body of the fourth torque transfer member includes the fourth recess.

14. The driveshaft assembly of claim 13, wherein each of the third torque transfer member and the fourth torque transfer member includes a pair of projections extending laterally from opposite sides of the body.

15. The driveshaft assembly of claim 14, wherein the driveshaft is configured to pivot about the first pivot axis relative to the first torque transfer member and the second torque transfer member; and
wherein the driveshaft, the first torque transfer member, and the second torque transfer member are each configured to pivot about the second pivot axis relative to the third torque transfer member and the fourth torque transfer member.

16. The driveshaft assembly of claim 15, wherein the cylindrical surface of the third recess slidingly engages a mating cylindrical surface of one projection of the first torque transfer member and a mating cylindrical surface of one projection of the second torque transfer member; and
wherein the cylindrical surface of the fourth recess slidingly engages a mating cylindrical surface of one projection of the first torque transfer member and a mating cylindrical surface of one projection of the second torque transfer member.

17. The driveshaft assembly of claim 16, wherein the first torque transfer member is integrally formed with the second torque transfer member.

18. The driveshaft assembly of claim 16, wherein the third torque transfer member is integrally formed with the fourth torque transfer member.

19. The driveshaft assembly of claim 16, wherein the receptacle of the first end housing includes a plurality of circumferentially spaced pockets;
wherein the plurality of pockets comprise a first pocket, a second pocket, a third pocket, and a fourth pocket;
wherein the body of the first torque transfer member is disposed in the first pocket, the body of the second torque transfer member is disposed in the second pocket, the body of the third torque transfer member is disposed in the third pocket, and the body of the fourth torque transfer member is disposed in the fourth pocket.

20. The driveshaft assembly of claim 19, wherein each pocket includes a pair of planar lateral side surfaces oriented parallel to the central axis;
wherein the body of the third torque transfer member includes a pair of planar lateral side surfaces that engage corresponding planar lateral side surfaces of the third pocket; and
wherein the body of the fourth torque transfer member includes a pair of planar lateral side surfaces that engage corresponding planar lateral side surfaces of the fourth pocket.

21. The driveshaft assembly of claim 20, wherein one projection of the third torque transfer member engages one of the planar lateral side surfaces of the first pocket and the other projection of the third torque transfer member engages one of the planar lateral side surfaces of the second pocket; and
wherein one projection of the fourth torque transfer member engages one of the planar lateral side surfaces of the first pocket and the other projection of the fourth torque transfer member engages one of the planar lateral side surfaces of the second pocket.

22. The driveshaft assembly of claim 16, wherein the receptacle of the first end housing includes a plurality of circumferentially spaced pockets;
wherein the plurality of pockets comprise a first and second pocket;
wherein the body of the first torque transfer member is disposed in the first pocket, the body of the second torque transfer member is disposed in the second pocket, the body of the third torque transfer member is integral with the end housing, and the body of the fourth torque transfer member is integral with the fourth pocket.

23. A mud motor, comprising;
a power section configured to convert pressure exerted by drilling fluid into a rotational torque;
a bearing assembly configured to be coupled a drill bit;
a driveshaft assembly disposed between the power section and the bearing assembly, the driveshaft assembly comprising:
a driveshaft having a longitudinal axis, a first end, and a second end opposite the first end;
wherein the first end of the driveshaft has a radially outer surface including:
a first connection lug,
a second connection lug uniformly circumferentially spaced from the first connection lug;
a third connection lug; and
a fourth connection lug uniformly circumferentially spaced from the third connection lug;
wherein the first connection lug and the second connection lug each include a cylindrical surface concentrically disposed about a first pivot axis oriented orthogonal to the longitudinal axis;

wherein the third connection lug and the fourth connection lug each include a pair of parallel planar side surfaces disposed on opposite sides of a second pivot axis; and wherein the second pivot axis is orthogonal to the first pivot axis and intersects the first pivot axis and the longitudinal axis at a point; and a first end housing having a central axis, a first end, a second end opposite the first end, and a receptacle extending axially from the first end, wherein the first end of the driveshaft is disposed in the receptacle;

a torque transfer assembly disposed in the receptacle and radially disposed between the first end housing and the first end of the driveshaft, wherein the torque transfer assembly slidingly engages the first connection lug, and the second connection lug;

wherein the torque transfer assembly includes a first torque transfer member, and a second torque transfer member, wherein each of the first torque transfer member, and the second torque transfer member includes a body and a pair of projections extending laterally from opposite sides of the body;

wherein the body of the first torque transfer member is at least partially disposed about the first connection lug, and the body of the second torque transfer member is at least partially disposed about the second connection lug; and wherein the driveshaft is configured to pivot about each of the first pivot axis and the second pivot axis relative to the first end housing.

24. The mud motor of claim 23, wherein the torque transfer assembly further includes a third torque transfer member and a fourth torque transfer member;

wherein each of the third torque transfer member, and the fourth torque transfer member includes a body and a pair of projections extending laterally from opposite sides of the body; and wherein the body of the third torque transfer member is at least partially disposed about the third connection lug, and the body of the fourth torque transfer member is at least partially disposed about the fourth connection lug.

25. The mud motor of claim 24, wherein the body of each of the first torque transfer member, the second torque transfer member, the third torque transfer member, and the fourth torque transfer member includes a cylindrical inner surface.

26. The mud motor of claim 25, wherein the driveshaft is configured to pivot about the first pivot axis relative to the first torque transfer member and the second torque transfer member.

27. The mud motor of claim 26, wherein the driveshaft, the first torque transfer member, and the second torque transfer member are each configured to pivot about the second pivot axis relative to the third torque transfer member and the fourth torque transfer member.

28. The mud motor of claim 27, wherein the cylindrical surface of the first torque transfer member and the cylindrical surface of the second torque transfer member are concentrically disposed about the first pivot axis; and wherein the cylindrical surface of the third torque transfer member and the cylindrical surface of the fourth torque transfer member are concentrically disposed about the second pivot axis.

29. The mud motor of claim 24, wherein the receptacle of the first end housing includes a plurality of circumferentially spaced pockets;

wherein the plurality of pockets comprise a first pocket, a second pocket, a third pocket, and a fourth pocket; and wherein the first torque transfer member is at least partially disposed in the first pocket, the second torque transfer member is at least partially disposed in the second pocket, the third torque transfer member is at least partially disposed in the third pocket, and the fourth torque transfer member is at least partially disposed in the fourth pocket.

30. The mud motor of claim 29, wherein the body of the third torque transfer member, the body of the fourth torque transfer member, each projection of the third torque transfer member, and each projection of the fourth torque transfer member slidingly engages the first end housing.

* * * * *